United States Patent
Zhao

(10) Patent No.: US 11,956,407 B2
(45) Date of Patent: Apr. 9, 2024

(54) IMAGE VIEW ANGLE CONVERSION/FAULT DETERMINATION METHOD AND DEVICE, APPARATUS AND MEDIUM

(71) Applicant: CHANGXIN MEMORY TECHNOLOGIES, INC., Hefei (CN)

(72) Inventor: Ruirui Zhao, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 404 days.

(21) Appl. No.: 17/447,426

(22) Filed: Sep. 12, 2021

(65) Prior Publication Data

US 2022/0239884 A1    Jul. 28, 2022

Related U.S. Application Data

(63) Continuation of application No. PCT/CN2021/103576, filed on Jun. 30, 2021.

(30) Foreign Application Priority Data

Jan. 25, 2021  (CN) .......................... 202110098842.5

(51) Int. Cl.
*G06K 9/00*   (2022.01)
*G01N 21/88*  (2006.01)
(Continued)

(52) U.S. Cl.
CPC ....... *H04N 13/111* (2018.05); *G01N 21/8851* (2013.01); *G01N 21/9505* (2013.01);
(Continued)

(58) Field of Classification Search
CPC ............... H04N 13/111; H04N 13/275; G01N 21/8851; G01N 21/9505; G01N 2021/8887; G06F 17/153; G06F 17/16; G06N 3/08

See application file for complete search history.

(56) References Cited

U.S. PATENT DOCUMENTS

2019/0162676 A1* 5/2019 Cheng ................. G01N 21/33
2020/0075287 A1* 3/2020 Jen .......................... H01J 37/30
(Continued)

FOREIGN PATENT DOCUMENTS

CN       102308583 B    4/2014
CN       108629823 A    10/2018
(Continued)

OTHER PUBLICATIONS

Zhu, Xinge, et al. "Generative adversarial frontal view to bird view synthesis." 2018 International conference on 3D Vision (3DV). IEEE, 2018). (Year: 2018).*

(Continued)

*Primary Examiner* — Avinash Yentrapati
(74) *Attorney, Agent, or Firm* — Syncoda LLC; Feng Ma

(57) ABSTRACT

An image view angle conversion method includes: model training data are obtained, the model training data including planar images of a training object at a plurality of different view angles and labels corresponding to respective view angles, where the labels corresponding to the different view angles are different. A pre-designed generative adversarial network model is trained according to the model training data to obtain a view angle conversion network model. A planar image of a target object and labels corresponding to one or more expected view angles of the target object are input into the view angle conversion network model, so that the view angle conversion network model generates planar images of the target object at the expected view angles.

16 Claims, 10 Drawing Sheets

(51) Int. Cl.
*G01N 21/95* (2006.01)
*G06F 17/15* (2006.01)
*G06F 17/16* (2006.01)
*G06N 3/08* (2023.01)
*H04N 13/111* (2018.01)
*H04N 13/275* (2018.01)

(52) U.S. Cl.
CPC ............ *G06F 17/153* (2013.01); *G06F 17/16* (2013.01); *G06N 3/08* (2013.01); *H04N 13/275* (2018.05); *G01N 2021/8887* (2013.01)

(56) References Cited

U.S. PATENT DOCUMENTS

| | | | |
|---|---|---|---|
| 2020/0088659 A1* | 3/2020 | Ma | G01N 23/2251 |
| 2020/0311955 A1* | 10/2020 | Yoshitake | G06T 7/001 |
| 2020/0334493 A1 | 10/2020 | Wu et al. | |
| 2021/0334935 A1* | 10/2021 | Grigoriev | G06N 3/08 |
| 2022/0088410 A1* | 3/2022 | Hibbard | G16H 20/40 |
| 2022/0215232 A1* | 7/2022 | Pardeshi | G06N 3/006 |

FOREIGN PATENT DOCUMENTS

| | | |
|---|---|---|
| CN | 110189278 A | 8/2019 |
| CN | 110363163 A | 10/2019 |
| WO | 2019237860 A1 | 12/2019 |

OTHER PUBLICATIONS

Yunjey Choi, et, al. StarGAN: Unified Generative Adversarial Networks for Multi-Domain Image-to-Image Translation, 2018 IEEE/CVF Conference on Computer Vision and Pattern Recognition.

* cited by examiner

IMAGE VIEW ANGLE CONVERSION/FAULT DETERMINATION METHOD AND DEVICE, APPARATUS AND MEDIUM

CROSS-REFERENCE TO RELATED APPLICATIONS

This is a continuation of International Application No. PCT/CN2021/103576 filed on Jun. 30, 2021, which claims priority to Chinese Patent Application No. 202110098842.5 filed on Jan. 25, 2021. The disclosures of these applications are hereby incorporated by reference in their entirety.

BACKGROUND

With the continuous development of the image synthesis technology and the continuous improvement of the image synthesis capability, the quality of a machine synthesized image is continuously improved. A multi-view synthesis technology based on a single view of an object is widely applied to the technical fields of computer vision, computer graphics, robot vision technology, virtual reality technology and the like.

SUMMARY

The disclosure relates to an image view angle conversion/fault determination method and device, an apparatus and a medium.

According to some embodiments, a first aspect of the disclosure provides an image view angle conversion method, which includes the following operations. Model training data are obtained, the model training data including planar images of a training object at multiple different view angles and labels corresponding to respective view angles, where the labels corresponding to the different view angles are different. A pre-designed generative adversarial network model is trained according to the model training data to obtain a view angle conversion network model. A planar image of a target object and labels corresponding to one or more expected view angles of the target object are input into the view angle conversion network model, so that the view angle conversion network model generates planar images of the target object at the expected view angles.

According to some embodiments, a second aspect of the disclosure provides a fault determination method, which includes the following operations. Model training data are obtained, the model training data include planar images of a training object at multiple different view angles and labels corresponding to respective view angles, and the labels corresponding to the different view angles are different. A pre-designed generative adversarial network model is trained according to the model training data to obtain a view angle conversion network model. A planar image of a target object and labels corresponding to one or more expected view angles of the target object are input into the view angle conversion network model, so that the view angle conversion network model generates a plurality of different planar images of the target object at the expected view angles. A stereoscopic image of the target object is generated according to the planar images at different view angles. Whether the target object has a fault is determined according to the stereoscopic image.

According to some embodiments, a third aspect of the disclosure provides an image view angle conversion device, which includes a memory storing processor-executable instructions; and a processor configured to execute the stored processor-executable instructions to perform operations of: acquiring model training data, the model training data comprising planar images of a training object at a plurality of different view angles and labels corresponding to respective view angles, wherein the labels corresponding to the different view angles are different; training a pre-designed generative adversarial network model according to the model training data to obtain a view angle conversion network model; and inputting a planar image of a target object and labels corresponding to one or more expected view angles of the target object into the view angle conversion network model, so that the view angle conversion network model generates planar images of the target object at the expected view angles.

The details of one or more embodiments of the disclosure are set forth in the drawings and description below. Other features and advantages of the disclosure will be apparent from the specification, the drawings, and the claims.

BRIEF DESCRIPTION OF THE DRAWINGS

In order to describe the technical solutions in the embodiments of the disclosure more clearly, the drawings required to be used in descriptions about the embodiments will be simply introduced below, obviously, the drawings described below are only some embodiments of the disclosure, and other drawings may further be obtained by those skill in the art according to the drawings without creative work.

DETAILED DESCRIPTION

Figure 1:
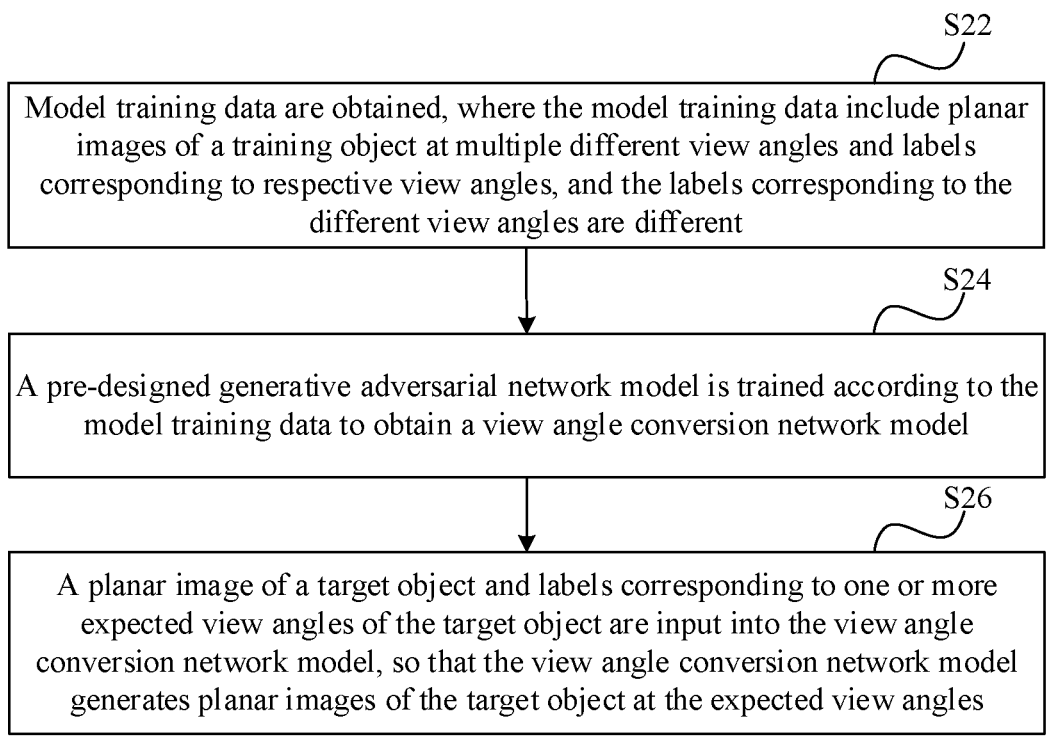
FIG. 1 is a schematic flow diagram of an image view angle conversion method according to an embodiment of the disclosure.

In order to facilitate an understanding of the disclosure, a more complete description of the disclosure will now be made with reference to the associated drawings. Preferable embodiments of the disclosure are given in the drawings. However, the disclosure may be realized in many different forms and is not limited to the embodiments described herein. Rather, the embodiments are provided so that a more thorough and complete understanding of the content of the disclosure is provided.

Unless defined otherwise, all technical and scientific terms used herein have the same meaning as commonly understood by those skilled in the art to which this disclosure belongs. The terms used in the specification of the disclosure herein is for the purpose of describing the specific embodiments only and is not intended to be limiting of the disclosure. As used herein, the term "and/or" includes any and all combinations of one or more of the associated listed items.

Where "comprising", "having" and "including" as described herein are used, another component may also be added unless explicit qualifiers such as "only", "consisting of" and the like are used. Unless mentioned to the contrary, a term in the singular may include the plural and is not to be construed as one in number.

It is to be understood that, although the terms "first", "second" and the like may be used herein to describe various elements, these elements should not be limited by these terms. These terms are only used to distinguish one element from another. For example, a first element could be termed a second element, and, similarly, a second element could be termed a first element, without departing from the scope of the disclosure.

In the description of the disclosure, it is to be noted that unless otherwise definitely specified and limited, terms "install", "mutually connect" and "connect" should be broadly understood. For example, the terms may refer to fixed connection and may also refer to detachable connection or integration. The terms may refer to direct connection, may also refer to indirect connection through a medium and may refer to communication in two components. For those of ordinary skill in the art, specific meanings of these terms in the disclosure can be understood according to a specific condition.

Image synthesis methods mainly include an image pixel-based method and a feature expression-based method. For the image pixel-based method, statistics collection needs to be performed on foreground and background information around unknown pixel points, and then values of the unknown pixel points are calculated according to the statistical information. When the foreground and the background are similar in color, texture, style and the like, the method is applicable; otherwise, the image synthesis effect is poor. The main idea of the feature expression-based method is to generate images according to feature vectors, and the most representative algorithm is the Principal Component Analysis (PCA) algorithm.

A traditional image synthesis method for a single view is affected by an observation angle, so that a large amount of spatial information is easily lost in a synthesized three-dimensional image of an observation object, the quality and the efficiency of the synthesized image are reduced, and meanwhile, three-dimensional features of the observation object at a single view angle may not be effectively identified.

Benefiting from the excellent expressive power of Convolutional Neural Networks (CNN), neural network-based image synthesis technologies are rapidly developing, with representative image synthesis technologies including Variational Auto-Encoder (VAE) and Generative Adversarial Network (GAN). The VAE includes an encoder and a decoder, an input image is mapped to a hidden space through the encoder, and variables in the hidden space are mapped into a real image through the decoder. The GAN includes a generator and a discriminator, the generator and the discriminator are trained in an adversarial manner, a training objective of the generator is to output a high-quality target image, and a training objective of the discriminator is to determine the target image as an image synthesized by the generator with high probability. In order to obtain image features of different view angles of a target object under a single view angle so as to identify image features of an invisible view angle of the target object, the disclosure provides an image view angle conversion/fault determination method and device, an apparatus and a medium.

Referring to FIG. 1, in one embodiment of the disclosure, an image view angle conversion method is provided, which includes the following steps.

In S22, model training data are obtained, the model training data including planar images of a training object at multiple different view angles and labels corresponding to respective view angles, where the labels corresponding to the different view angles are different.

In S24, a pre-designed generative adversarial network model is trained according to the model training data to obtain a view angle conversion network model.

In S26, a planar image of a target object and labels corresponding to one or more expected view angles of the target object are input into the view angle conversion network model, so that the view angle conversion network model generates planar images of the target object at the expected view angles.

Specifically, with further reference to FIG. 1, by pre-designing the generative adversarial network model, the acquired model training data including the planar images of multiple different view angles of the training object and the labels corresponding to respective view angles are input into the generative adversarial network model to train the generative adversarial network model, so that the generative adversarial network model deeply learn a multi-view conversion relation of the training object under different view angles, and the view angle conversion network model is obtained. Then the planar image of the target object and labels corresponding to one or more expected view angles of the target object are input into the view angle conversion network model, so that the view angle conversion network model generates planar images of the target object at the expected view angles. In this way, it is possible to acquire planar images of the target object at at least one expected view angle according to a planar image of the target object at a single view angle, perform three-dimensional reconstruction t on the target object according to the obtained planar images at multiple different expected view angles, and obtain the three-dimensional image of the target object, so that the three-dimensional features of the target object are effectively identified.

Figure 2:
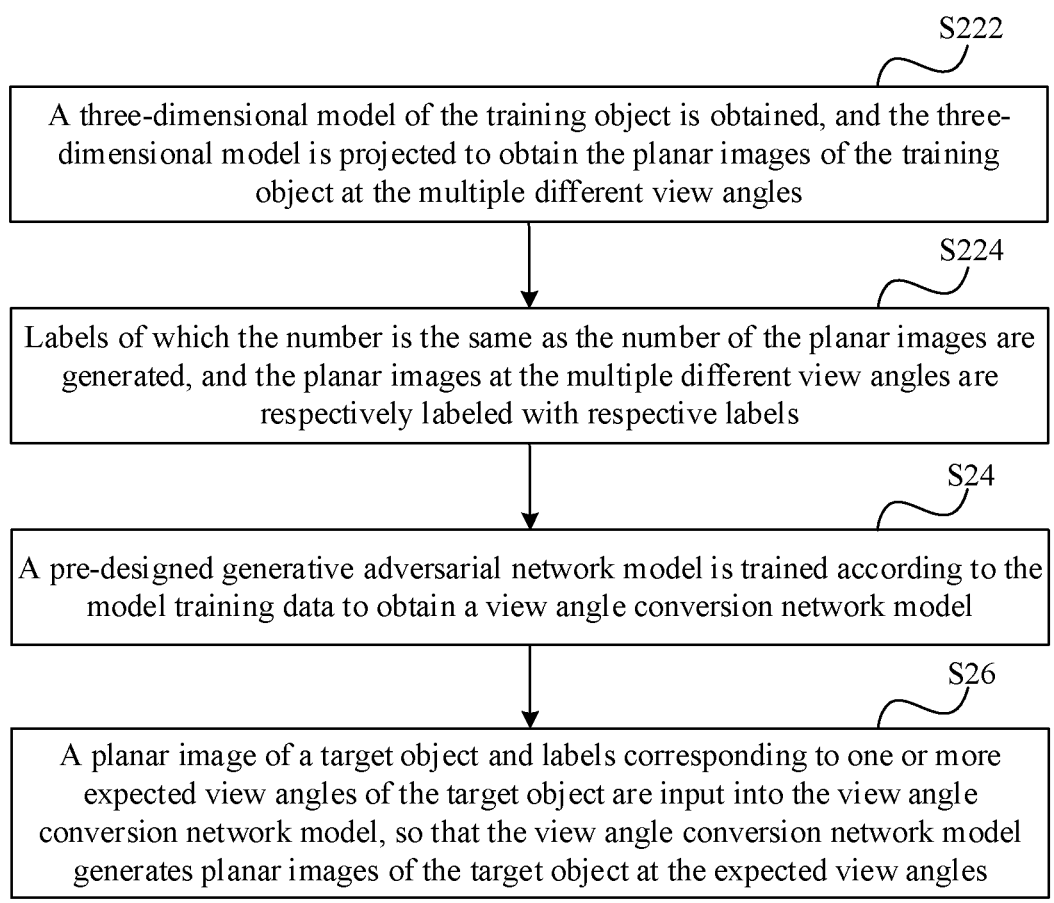
FIG. 2 is a schematic flow diagram of an image view angle conversion method according to another embodiment of the disclosure.

Furthermore, referring to FIG. 2, in one embodiment of the disclosure, the operation that the model training data are obtained includes the following operations.

In S222, a three-dimensional model of the training object is obtained, and the three-dimensional model is projected to obtain the planar images of the training object at the multiple different view angles.

In S224, labels of which the number is the same as the number of the planar images are generated, and the planar images at the multiple different view angles are labeled with respective labels.

Specifically, with further reference to FIG. 1, by acquiring the three-dimensional model of the training object, and projecting the three-dimensional model, the planar images at the multiple different view angles of the training object are obtained. As various types of objects exist in a real scene, a 3D CAD model of the selected type of object is projected in a data driving mode, and then the planar images at the multiple different view angles of the object are obtained. In order to establish alignment of view angles of the object in different views, an open source toolkit ShapeNet-Viewer may be used for generating multiple planar rendering images at different view angles in batches for a specific object type, then labels with the same number as the planar images are generated according to the number of the planar images of the different view angles, and the planar images at the multiple different view angles are labeled with respective labels to obtain the model training data. Therefore, the pre-designed generative adversarial network model may be pre-trained through the model training data, the view angle conversion network model is obtained, a planar image of the target object at at least one expected view angle is obtained according to a planar image of the target object at a single view angle, and image features of the invisible view angle of the target object are obtained.

Figure 3:
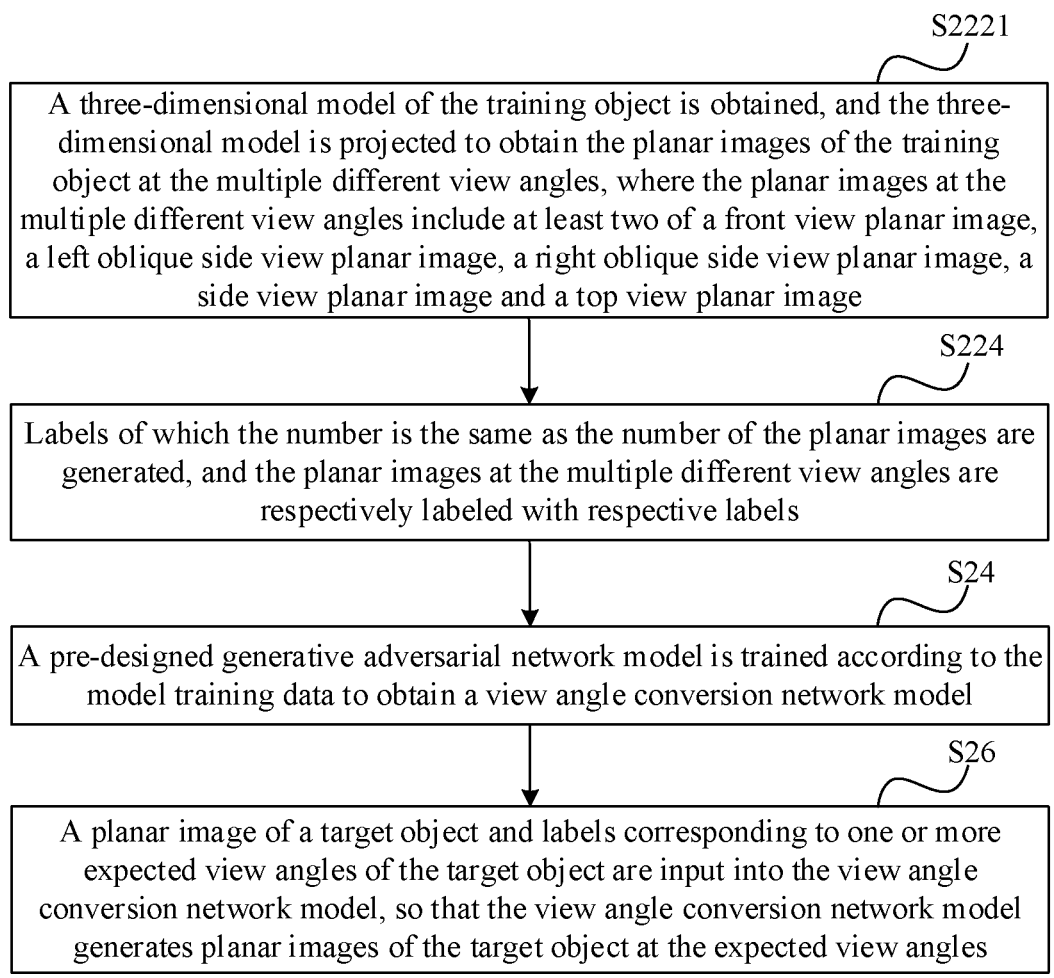
FIG. 3 is a schematic flow diagram of an image view angle conversion method according to still another embodiment of the disclosure.

As an example, referring to FIG. 3, in one embodiment of the disclosure, the operation that the model training data are obtained includes the following operations.

In S2221, a three-dimensional model of the training object is obtained, the three-dimensional model is projected to obtain the planar images of the training object at the multiple different view angles, and the planar images at the multiple different view angles include at least two of a front view planar image, a left oblique side view planar image, a right oblique side view planar image, a side view planar image and a top view planar image.

In S224, labels of which the number is the same as the number of the planar images are generated, and the planar images at the multiple different view angles are respectively labeled with respective labels.

Specifically, with further reference to FIG. 3, the planar images at the multiple different view angles may be set to include the front view planar images, the left oblique side view planar images, the right oblique side view planar images, the side view planar images and the top view planar images. For example, an open source toolkit ShapeNet-Viewer may be used for generating planar rendering image at the aforementioned 5 view angles in batches for a specific object type. Then 5 labels are generated, and the planar images of the aforementioned 5 view angles are labeled with respective labels to obtain the model training data. The labels may be set as encoding vectors, for example, the front view planar images may be labeled 00010, the left oblique side view planar images may be labeled 10000, the right oblique side view planar images may be labeled 00100, the side view planar images may be labeled 01000, and the top view planar images may be labeled 00001, so that 5 planar images at different view angles labeled with the corresponding encoding vectors are obtained, the model training data are obtained, therefore, the pre-designed generative adversarial network model may be trained through the model training data, the view angle conversion network model is obtained, the complexity of training the generative adversarial network model is effectively reduced, and the risk of overfitting of the view angle conversion network model is reduced.

As an example, in an embodiment of the disclosure, the labels include encoding vectors, the generative adversarial network model includes a generator G and a discriminator D, and the operation that the view angle conversion network model is obtained includes the following operations.

In S241, a preset input image x and a preset input encoding vector c of the training object are obtained.

In S242, a pre-generated image G(x, c) output by G is acquired according to the preset input image x and the preset input encoding vector c.

In S243, an adversarial loss Ladv is determined according to the pre-generated image G(x, c) and probability distribution D(x) of D, and the adversarial loss Ladv is defined as follows:

$$L_{adv}=E_x[\log D(x)]+E_{x,c}[\log(1-D(G(x,c)))];$$

In S244, a target value of the adversarial loss Ladv is calculated such that the probability distribution D(x) of the discriminator D takes a maximum value while the pre-generated image G(x, c) takes a minimum value.

G and D are trained in an adversarial manner, G is trained to output a high-quality target image to D; D is trained to determine the target image as the image synthesized by the generator with high probability; the target value of the adversarial loss Ladv is calculated by using an adversarial loss constraint model and in combination with the generative adversarial network, so that the probability distribution D(x) of the discriminator D takes the maximum value while the pre-generated image G(x, c) takes the minimum value, thereby effectively improving the perception quality of the output image.

As an example, in one embodiment of the disclosure, the operation that a pre-generated image G(x, c) output by G is acquired according to the preset input image x and the preset input encoding vector c includes the following operations.

In S2421, a high-dimensional feature of a preset dimension is obtained according to the preset input coding vector c.

In S2422, a feature vector is generated according to the high-dimensional feature of the preset dimension.

In S2423, the preset input image x and the feature vector are input into G, so that G generates the pre-generated image G(x, c).

As an example, in one embodiment of the disclosure, G may be configured to include a first convolution layer, a second convolution layer, residual modules, and a deconvolution layer arranged in sequence, and the first convolution layer is arranged to include a convolution kernel having a size of 7*7; the second convolution layer is arranged to include two convolution kernels with a size of 3*3 and a stride of 2; the number of the residual modules is set to be 9; and the deconvolution layer is arranged to include two convolution kernels with a size of 4*4 and a stride of 2. Taking G as an example, the technical principle implemented by the disclosure is exemplarily illustrated. An RGB image with the resolution ratio of 128*128 and a 5-dimensional encoding vector may be input to G, the encoding vector obtains a high-dimensional feature with the dimension of 1024 through two fully-connected layers, then a 32*32 low-dimensional feature is generated according to the high-dimensional feature, the low-dimensional feature and the feature obtained after the input image passes through three convolution layers are output through a CONCAT function, and thus the generator capable of generating a high-quality target image is obtained.

As an example, in one embodiment of the disclosure, the operation that the view angle conversion network model is obtained includes the following operations.

In S2424, probability distribution D(c'|x) of an original encoding vector c' of D is acquired.

In S2425, domain classification loss $L_{cls}^r$ of the real image is determined according to the probability distribution D(c'|x) of the original encoding vector c', domain classification loss $L_{cls}^f$ of the pre-generated image is determined according to the pre-generated image G(x, c), and the domain classification loss $L_{cls}^r$ of the real image and the domain classification loss $L_{cls}^f$ of the pre-generated image are defined as follows:

$$L_{cls}^r = E_{x,c'}[-\log D(c'|x)];$$

$$L_{cls}^f = E_{x,c}[-\log D(c|G(x,c))].$$

In 2426, a minimum value of the domain classification loss $L_{cls}^r$ of the real image and a minimum value of the domain classification loss $L_{cls}^f$ of the pre-generated image are calculated to obtain the view angle conversion network model.

By combining with the generative adversarial network and calculating the minimum value of the domain classification loss $L_{cls}^r$ of the real image and the minimum value of the domain classification loss $L_{cls}^f$ of the pre-generated image, the view angle conversion network model is obtained, and the view angle conversion network model is optimized through the adversarial loss constraint mode, so that the perception quality of the output image is effectively improved.

As an example, in an embodiment of the disclosure, the target is a wafer. By training the pre-designed generative adversarial network model, a multi-view conversion relation of the wafer under different view angles is learned deeply, so that a view angle conversion network model of the wafer is obtained; then the planar images of the wafer and the labels corresponding to the expected view angle are input into the view angle conversion network model of the wafer, so that the view angle conversion network model of the wafer generates planar images of the wafer at multiple different expected view angles. Therefore, three-dimensional reconstruction may be carried out on the wafer according to the planar images at the multiple different expected view angles, the three-dimensional image of the wafer is obtained, and the three-dimensional features of the wafer are effectively identified.

Figure 4:
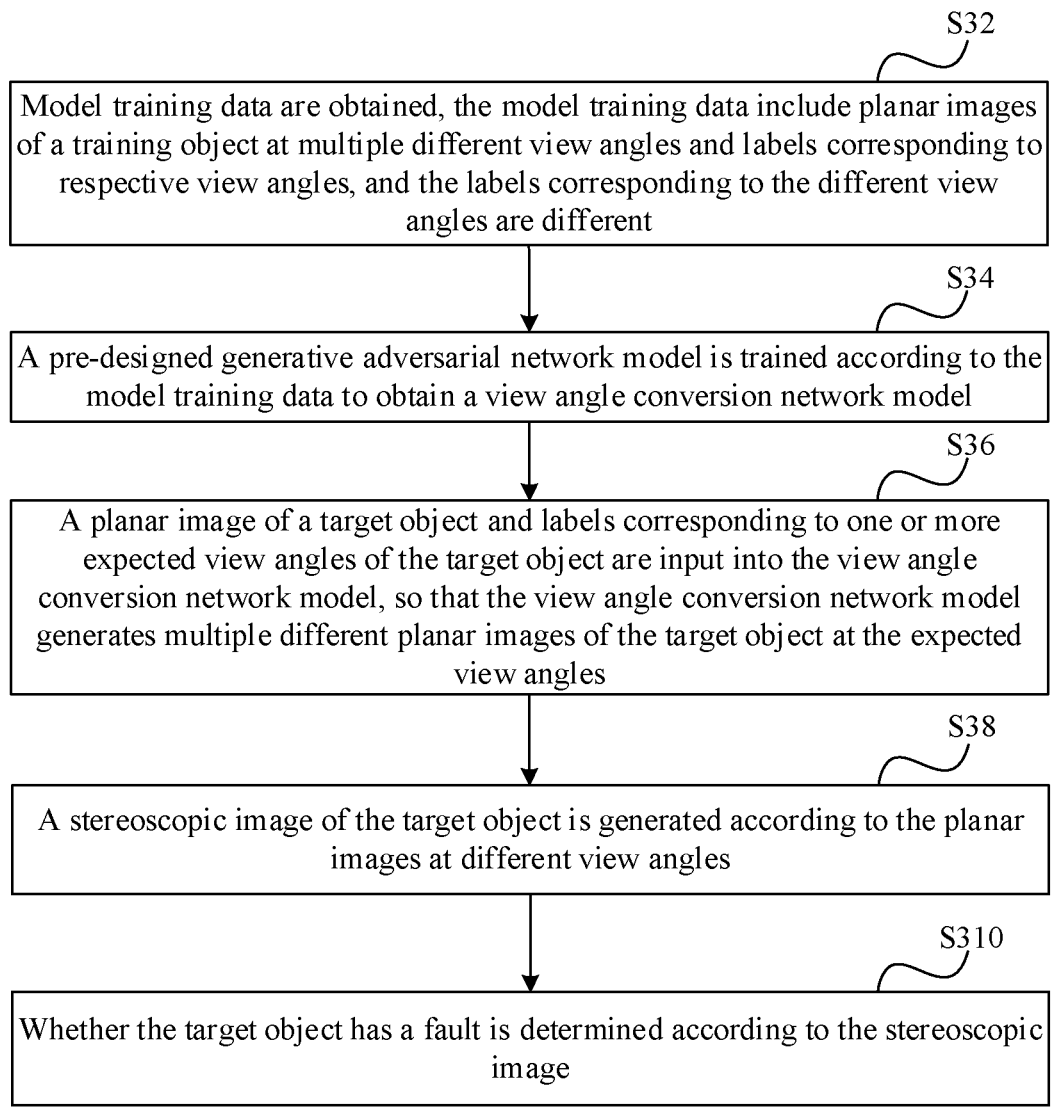
FIG. 4 is a schematic flow diagram of a fault determination method according to an embodiment of the disclosure.

Furthermore, referring to FIG. 4, in one embodiment of the disclosure, a fault determination method is provided, which includes the following operations.

In S32, model training data are obtained, the model training data including planar images of a training object at multiple different view angles and labels corresponding to respective view angles, where the labels corresponding to the different view angles are different.

In S34, a pre-designed generative adversarial network model is trained according to the model training data to obtain a view angle conversion network model.

In S36, a planar image of a target object and labels corresponding to one or more expected view angles of the target object are input into the view angle conversion network model, so that the view angle conversion network model generates multiple different planar images of the target object at the expected view angles.

In S38, a stereoscopic image of the target object is generated according to the planar images at different view angles.

In S310, whether the target object has a fault is determined according to the stereoscopic image.

Specifically, with further reference to FIG. 4, by pre-designing the generative adversarial network model, the acquired model training data including the planar images of multiple different view angles of the training object and labels corresponding to respective view angles are input into the generative adversarial network model to train the generative adversarial network model, so that the generative adversarial network model deeply learn a multi-view conversion relation of the training object under different view angles, and the view angle conversion network model is obtained. Then the planar image of the target object and labels corresponding to one or more expected view angles of the target object are input into the view angle conversion network model, so that the view angle conversion network model generates multiple planar images of the target object at the expected view angles. Three-dimensional reconstruction is carried out on the target object according to the obtained planar images at multiple different expected view angles to obtain a three-dimensional image of the target object, thereby obtaining image features of an invisible part of the target object, meanwhile, whether the target object has a fault is determined according to the three-dimensional image features of the target object, so that the efficiency and intelligence of fault determination are effectively improved.

Figure 5:
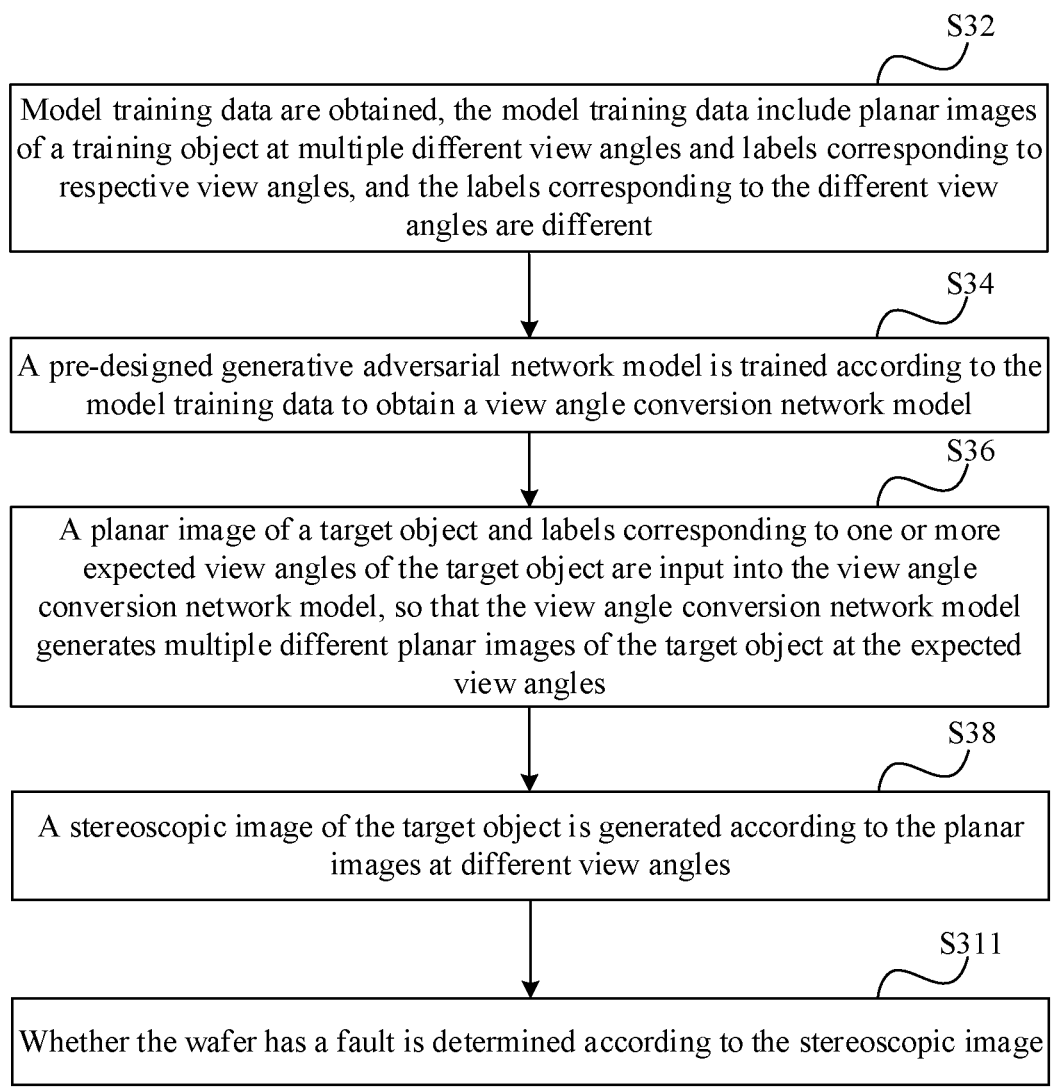
FIG. 5 is a schematic flow diagram of a fault determination method according to another embodiment of the disclosure.

Furthermore, referring to FIG. 5, in an embodiment of the disclosure, the target object is a wafer. The operation that whether the target object has a fault is determined according to the stereoscopic image includes the following operations.

In S311, whether the wafer has a defect is determined according to the stereoscopic image.

Specifically, with further reference to FIG. 5, by training the pre-designed generative adversarial network model, a multi-view conversion relation of the wafer under different view angles is learned deeply, so that a view angle conversion network model of the wafer is obtained; then the planar images of the wafer and the labels corresponding to the expected view angle are input into the view angle conversion network model of the wafer, so that the wafer view angle conversion network model generates planar images of the wafer at multiple different expected view angles. Three-dimensional reconstruction is carried out on the wafer according to the obtained planar images at multiple different expected view angles to obtain a three-dimensional image of the wafer, thereby obtaining image features of an invisible part of the wafer, meanwhile, whether the wafer has a defect is determined according to the stereoscopic image features of the wafer, so that the efficiency and intelligence for identifying defective wafers are effectively improved.

It should be understood that while various steps in the flowcharts of FIGS. 1-5 are shown in sequence as indicated by arrows, the steps are not necessarily performed in sequence as indicated by arrows. Except where expressly stated herein, the execution of the steps is not strictly limited in sequence and the steps may be executed in other sequences. Moreover, although at least a portion of the steps in FIGS. 1-5 may include multiple sub-steps or multiple stages, the sub-steps or stages need not necessarily be performed at the same time but may be performed at different times, and the sub-steps or stages may not necessarily be performed sequentially, rather, may be performed in turn or in alternation with at least a portion of other steps or sub-steps or stages of other steps.

Figure 6:
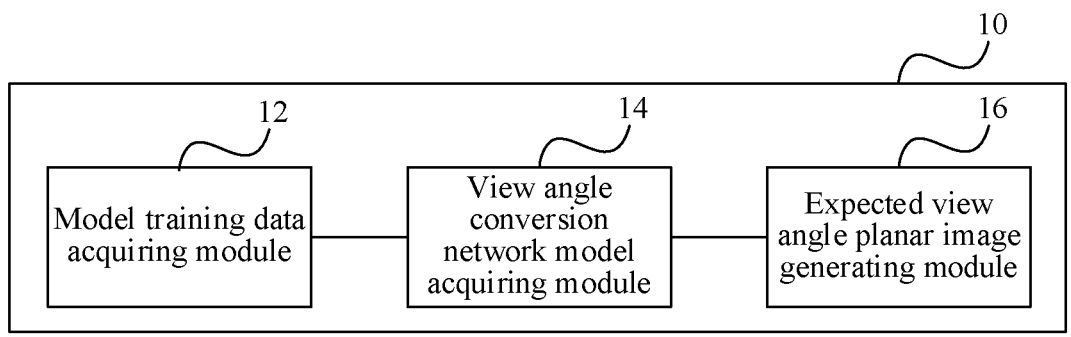
FIG. 6 is a structure diagram of an image view angle conversion device according to an embodiment of the disclosure.

Furthermore, referring to FIG. 6, in an embodiment of the disclosure, an image view angle conversion device 10 is provided. The image view angle conversion device 10 includes a model training data acquiring module 12, a view angle conversion network model acquiring module 14 and an expected view angle planar image generating module 16, the model training data acquiring module 12 is configured to acquire model training data, the model training data including planar images of a training object at multiple different view angles and labels corresponding to respective view angles, where the labels corresponding to the different view angles are different. The view angle conversion network model acquiring module 14 is configured to train a pre-designed generative adversarial network model according to the model training data to obtain a view angle conversion network model. The expected view angle planar image generating module 16 is configured to input a planar image of a target object and labels corresponding to one or more expected view angles of the target object into the view angle conversion network model, so that the view angle conversion network model generates planar images of the target object at the expected view angles.

Furthermore, referring to FIG. 6, the model training data acquiring module 12 is configured to acquire model training data, the model training data including planar images of a training object at multiple different view angles and labels corresponding to respective view angles, where the labels corresponding to the different view angles are different. The view angle conversion network model acquiring module 14 is configured to train a pre-designed generative adversarial network model according to the model training data to obtain a view angle conversion network model. After the expected view angle planar image generating module 16 is configured to input a planar image of a target object and labels corresponding to one or more expected view angles of the target object into the view angle conversion network model, the view angle conversion network model generates planar images of the target object at the expected view angles, three-dimensional reconstruction is performed on the target object according to the obtained planar images at multiple different expected view angles, the three-dimensional image of the target object is obtained, and the three-dimensional features of the target object are effectively identified.

Figure 7:
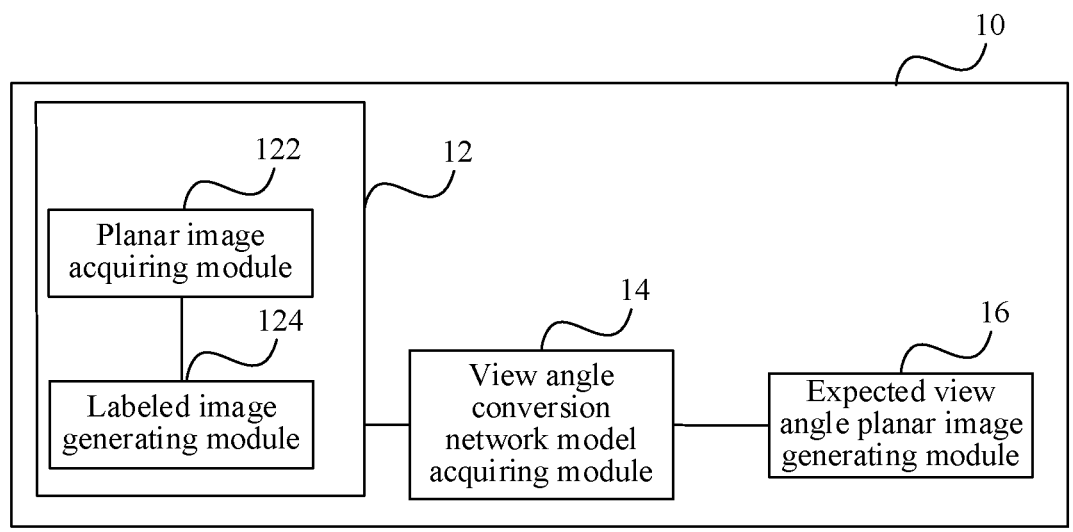
FIG. 7 is a structure diagram of an image view angle conversion device according to another embodiment of the disclosure.

Furthermore, referring to FIG. 7, in an embodiment of the disclosure, the model training data acquiring module 12 includes a planar image acquiring module 122 and a labeled image generating module 124. The planar image acquiring module 122 is configured to acquire a three-dimensional model of a training object, and the three-dimensional model is projected, so that the planar images of the training object at the multiple different view angles are obtained. The labeled image generating module 124 is configured to generate the same number of encoding vectors as the planar images, and label the planar images at the multiple different view angles with respective labels.

Specifically, with further reference to FIG. 7, the planar image acquiring module 122 is configured to acquire the three-dimensional model of the training object, the three-dimensional model is projected, so that the planar images of the training object at the multiple different view angles are obtained. The labeled image generating module 124 is configured to generate the same number of labels as the planar images according to the number of the planar images of the different view angles, and label the planar images at the multiple different view angles with respective labels, so that model training data are obtained. In this way, the pre-designed generative adversarial network model may be trained through the model training data to obtain the view angle conversion network model, planar images of the target object at at least one expected view angle are obtained according to an planar image of the target object at a single view angle, and the image features of the invisible view angle of the target object are obtained.

As an example, in an embodiment of the disclosure, the planar images at the multiple different view angles may be set to include the a front view planar image, a left oblique side view planar image, a right oblique side view planar image, a side view planar image and a top view planar image. For example, the open source toolkit ShapeNet-Viewer may be used for generating planar rendering images at the aforementioned 5 view angles in batches for a specific object type. Then 5 labels are generated, and the planar images at the aforementioned 5 view angles are labeled with respective labels to obtain the model training data. The labels may be set as encoding vectors, for example, the front view planar image may be labeled with 00010, the left oblique side view planar image may be labeled with 10000, the right oblique side view planar image may be labeled with 00100, the side view planar image may be labeled with 01000, and the top view planar image may be labeled with 00001, so that the planar images at the multiple different view angles labeled with the corresponding encoding vectors are obtained, the model training data are obtained, therefore, the pre-designed generative adversarial network model may be trained through the model training data, the view angle conversion network model is obtained, the complexity of training the generative adversarial network model is effectively reduced, and the risk of overfitting of the view angle conversion network model is reduced.

As an example, in an embodiment of the disclosure, the target object is a wafer. Planar images at multiple different expected view angles are obtained according to a planar image of the wafer at a single view angle, three-dimensional reconstruction is carried out on the wafer according to the obtained planar images at multiple different expected view angles, the three-dimensional image of the wafer is obtained, and the three-dimensional features of the wafer are effectively identified.

The above definition of the image view angle conversion method may be referred to for specific definition of the image view angle conversion device, and is not repeated here.

Figure 8:
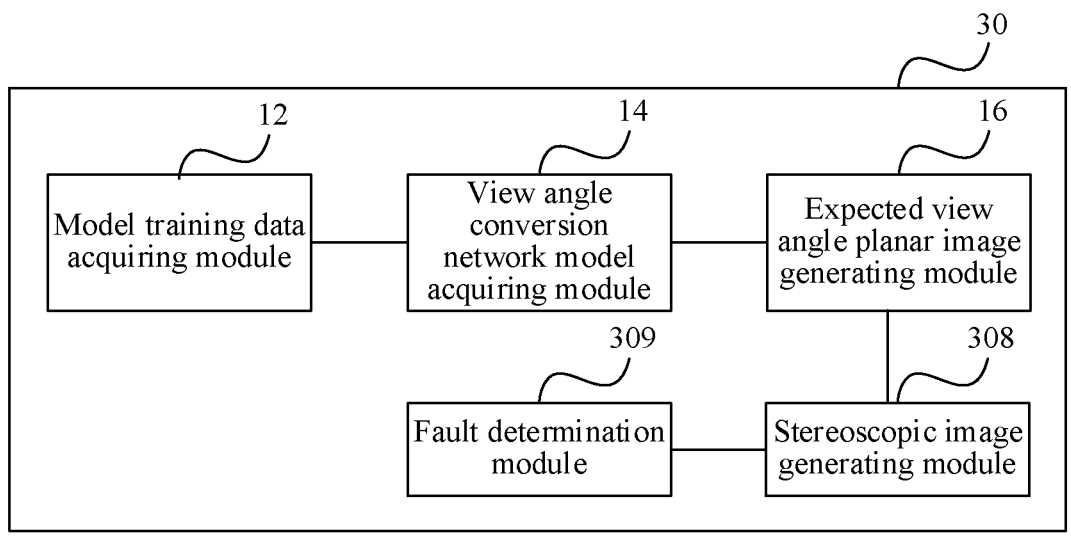
FIG. 8 is a structure diagram of a fault determination device according to an embodiment of the disclosure.

Furthermore, referring to FIG. 8, in an embodiment of the disclosure, a fault determination device 30 is provided. The fault determination device 30 includes a model training data acquiring module 12, a view angle conversion network model acquiring module 14, an expected view angle planar image generating module 16, a stereoscopic image generating module 308 and a fault determination module 309. The model training data acquiring module 12 is configured to acquire model training data, the model training data including planar images of a training object at multiple different view angles and labels corresponding to respective view angles, where the labels corresponding to the different view angles are different. The view angle conversion network model acquiring module 14 is configured to train a pre-designed generative adversarial network model according to the model training data to obtain a view angle conversion network model. The expected view angle planar image generating module 16 is configured to input a planar image of a target object and labels corresponding to one or more expected view angles of the target object into the view angle conversion network model, so that the view angle conversion network model generates planar images of the target object at the expected view angles. The stereoscopic image generating module 308 is configured to generate a stereoscopic image of the target object according to the planar images at different view angles. The fault determination module 309 is configured to determine according to the stereoscopic image whether the target object has a fault.

Specifically, with further reference to FIG. 8, the model training data acquiring module 12 is configured to model training data, the model training data including planar images of a training object at multiple different view angles and labels corresponding to respective view angles, where the labels corresponding to the different view angles are different. The view angle conversion network model acquiring module 14 is configured to train a pre-designed generative adversarial network model according to the model training data to obtain a view angle conversion network model. After the expected view angle planar image generating module 16 is configured to input a planar image of a target object and labels corresponding to one or more expected view angles of the target object into the view angle conversion network model, the view angle conversion network model generates multiple planar images of the target object at the expected view angles. The stereoscopic image generating module 308 is configured to generate a stereoscopic image of the target object according to the planar images at different view angles. The fault determination module 309 may determine according to the stereoscopic image whether the target object has a fault, so that the efficiency and intelligence of fault determination are effectively improved.

Figure 9:
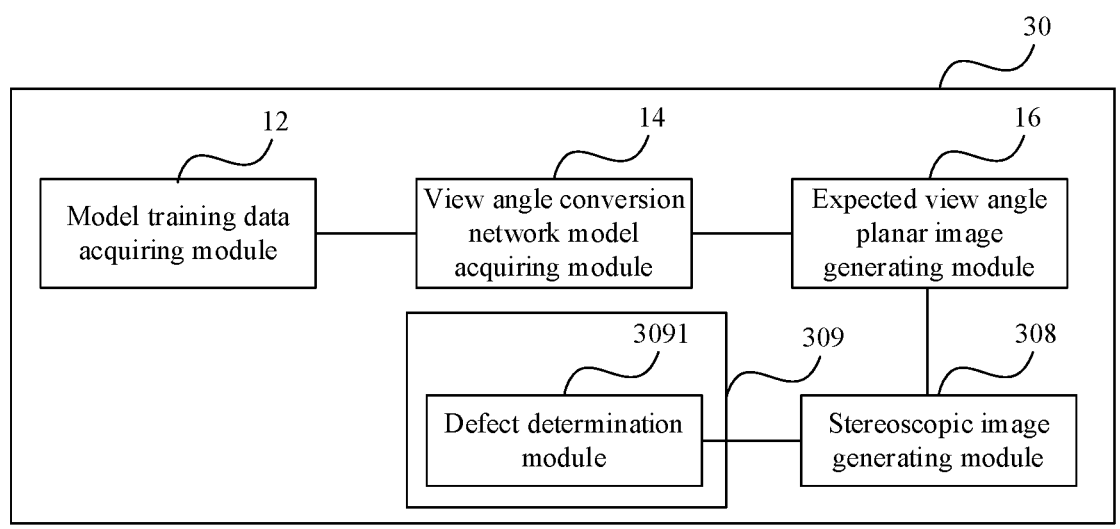
FIG. 9 is a structure diagram of a fault determination device according to another embodiment of the disclosure.

Furthermore, referring to FIG. 9, in an embodiment of the disclosure, the target object is a wafer. The fault determination module 309 includes a defect determination module 3091 for determining according to the stereoscopic image whether the wafer has a defect. By training the pre-designed generative adversarial network model, a multi-view conversion relation of the wafer under different view angles is learned deeply, so that a view angle conversion network model of the wafer is obtained; then the planar images of the wafer and the labels corresponding to the expected view angle are input into the view angle conversion network model of the wafer, so that the view angle conversion network model of the wafer generates planar images of the wafer at multiple different expected view angles. Three-dimensional reconstruction is carried out on the wafer according to the obtained planar images at multiple different expected view angles to obtain a three-dimensional image of the wafer, thereby obtaining image features of an invisible part of the wafer, meanwhile, whether the wafer has defects is determined according to the stereoscopic image features of the wafer, so that the efficiency and intelligence for identifying defective wafers are effectively improved.

The above definition of the fault determination method may be referred to for specific definition of the fault determination device, and is not repeated here.

Figure 10:
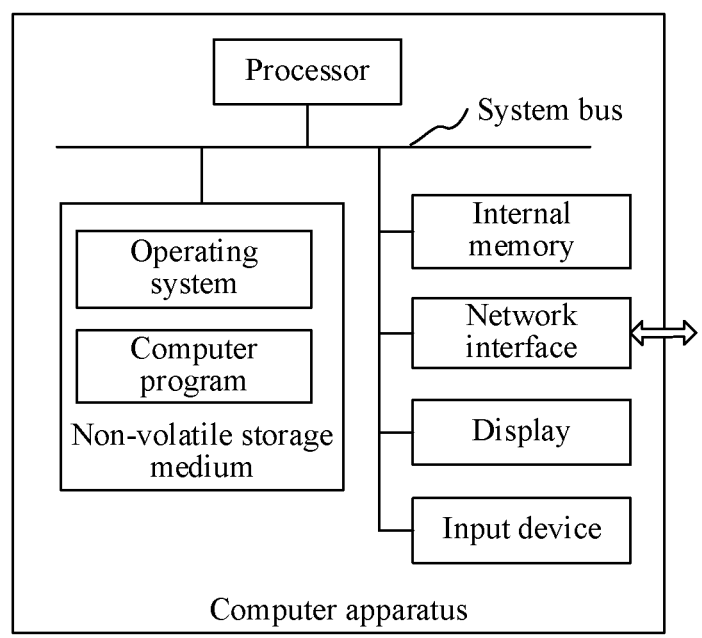
FIG. 10 is a structural schematic diagram of a computer apparatus according to an embodiment of the disclosure.

Furthermore, referring to FIG. 10, in an embodiment of the disclosure, a computer apparatus is provided. The computer apparatus includes a memory and a processor, the memory stores a computer program executable on the processor, and when the processor implements the program, the steps of the method according to any of the embodiments of the disclosure can be implemented.

Those skilled in the art will appreciate that the structure shown in FIG. 10 is merely a block diagram of a portion of the structure associated with the solution of the disclosure and does not constitute a limitation of a computer apparatus to which the solution of the disclosure is applied, and that a particular computer apparatus may include more or fewer components than shown, or combine certain components, or have a different arrangement of components.

Furthermore, in an embodiment of the disclosure, a computer-readable storage medium is provided, a computer program is stored on the computer-readable storage medium, when the computer program is executed by the processor, the steps of the method as set forth in any one of the embodiments of the present application are executed.

Specifically, in the computer apparatus or computer-readable storage medium provided by the embodiment of the disclosure, by pre-designing the generative adversarial network model, the acquired model training data including the planar images of multiple different view angles of the training object and labels corresponding to respective view angles are input into the generative adversarial network model to train the generative adversarial network model, so that the generative adversarial network model deeply learn a multi-view conversion relation of the training object under different view angles, and the view angle conversion network model is obtained. Then the planar image of the target object and labels corresponding to one or more expected view angles of the target object are input into the view angle conversion network model, so that the view angle conversion network model generates planar images of the target object at the expected view angles. In this way, it is possible to acquire planar images of the target object at at least one expected view angle according to a planar image of the target object at a single view angle, perform three-dimensional reconstruction t on the target object according to the obtained planar images at multiple different expected view angles, and obtain the three-dimensional image of the target object, so that the three-dimensional features of the target object are effectively identified.

Those of ordinary skill in the art will appreciate that implementing all or part of the processes in the methods described above may be accomplished by instructing associated hardware by a computer program, which may be stored in a non-volatile computer-readable storage medium, which, when executed, processes may be included as embodiments of the methods described above. Any reference to memory, storage, database, or other medium used in the various embodiments provided herein may include non-volatile and/or volatile memory. Nonvolatile memory may include Read Only Memory (ROM), Programmable ROM (PROM), Electrically Programmable ROM (EPROM), Electrically Erasable Programmable ROM (EEPROM), or flash memory. Volatile memory may include Random Access Memory (RAM) or external cache memory. By way of illustration and not limitation, RAM is available in many forms such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus direct RAM (RDRAM), Direct Rambus Dynamic RAM (DRDRAM), and Rambus Dynamic RAM (RDRAM), among others.

The technical features of the above-described embodiments can be randomly combined, and not all possible combinations of the technical features in the above-described embodiments are described for simplicity of description, however, as long as the combinations of the technical features do not contradict each other, they should be considered to be within the scope of the description of the present specification.

The embodiments described above represent only several implementation modes of the disclosure, and the description thereof is specific and detailed, but should not be construed as limiting the scope of disclosure accordingly. It should be pointed out that those of ordinary skill in the art can also make some modifications and improvements without departing from the concept of the disclosure, and these modifications and improvements all fall within the scope of protection of the disclosure. Accordingly, the scope of the patent of the present application should be subject to the appended claims.

What is claimed is:

1. An image view angle conversion method, comprising:
acquiring model training data, the model training data comprising planar images of a training object at a plurality of different view angles and labels corresponding to respective view angles, wherein the labels corresponding to the different view angles are different;
training a pre-designed generative adversarial network model according to the model training data to obtain a view angle conversion network model; and
inputting a planar image of a target object and labels corresponding to one or more expected view angles of the target object into the view angle conversion network model, so that the view angle conversion network model generates planar images of the target object at the expected view angles;
wherein the labels comprise encoding vectors, and the generative adversarial network model comprises a generator G and a discriminator D,
acquiring the view angle conversion network model comprises:
acquiring a preset input image x and a preset input encoding vector c of the training object;
acquiring a pre-generated image G(x, c) output by the generator G according to the preset input image x and the preset input encoding vector c;
determining an adversarial loss Ladv according to the pre-generated image G(x, c) and a probability distribution D(x) of the discriminator D, wherein the adversarial loss Ladv is defined as:

$$L_{adv}=E_x[\log D(x)]+E_{x,c}[\log(1-D(G(x,c)))]; \text{ and}$$

calculating a target value of the adversarial loss Ladv such that the probability distribution D(x) of the discriminator D takes a maximum value while the pre-generated image G(x, c) takes a minimum value.

2. The method of claim 1, wherein acquiring the model training data comprises:
acquiring a three-dimensional model of the training object, and projecting the three-dimensional model to obtain the planar images of the training object at the plurality of different view angles; and
generating the labels of which the number is the same as the number of the planar images, and labeling the planar images at the plurality of different view angles with respective labels.

3. The method of claim 2, wherein the planar images at the plurality of different view angles comprise at least two of a front view planar image, a left oblique side view planar image, a right oblique side view planar image, a side view planar image and a top view planar image.

4. The method of claim 1, wherein acquiring a pre-generated image G(x, c) output by the generator G according to the preset input image x and the preset input encoding vector comprises:
acquiring a high-dimensional feature of a preset dimension according to the preset input coding vector c;
generating a feature vector according to the high-dimensional feature of the preset dimension; and
inputting the pre-generated image G(x, c) and the feature vector into the generator G, so that the generator G generates the pre-generated image G(x, c).

5. The method of claim 1, wherein acquiring the view angle conversion network model further comprises:
acquiring probability distribution D(c'|x) of an original encoding vector c' of the discriminator D;
determining domain classification loss $L_{cls}^{r}$ of a real image according to the probability distribution D(c'|x) of the original encoding vector c', and determining domain classification loss $L_{cls}^{f}$ as of the pre-generated image according to the pre-generated image G(x, c), wherein the domain classification loss $L_{cls}^{r}$ of the real image and the domain classification loss $L_{cls}^{f}$ of the pre-generated image are defined as:

$$L_{cls}^{r}=E_{x,c'}[-\log D(c'|x)];$$

$$L_{cls}^{f}=E_{x,c}[-\log D(c|G(x,c))]; \text{ and}$$

calculating a minimum value of the domain classification loss $L_{cls}^{r}$ of the real image and a minimum value of the domain classification loss $L_{cls}^{f}$ of the pre-generated image to obtain the view angle conversion network model.

6. The method of claim 1, wherein the generator G comprises the following components distributed in sequence:
a first convolution layer, comprising a convolution kernel having a size of 7*7;
a second convolution layer, comprising two convolution kernels with a size of 3*3 and a stride of 2;
residual modules, the number of which is 9; and
a deconvolution layer, comprising two convolution kernels with a size of 4*4 and a stride of 2.

7. The method of claim 1, wherein the target object is a wafer.

8. A fault determination method, comprising:
acquiring model training data, the model training data comprising planar images of a training object at a plurality of different view angles and labels corresponding to respective view angles, and the labels corresponding to the different view angles are different;
training a pre-designed generative adversarial network model according to the model training data to obtain a view angle conversion network model;
inputting a planar image of a target object and labels corresponding to one or more expected view angles of the target object into the view angle conversion network model, so that the view angle conversion network model generates a plurality of different planar images of the target object at the expected view angles;
generating a stereoscopic image of the target object according to the planar images at different view angles; and
determining according to the stereoscopic image whether the target object has a fault;
wherein the labels comprise encoding vectors, and the generative adversarial network model comprises a generator G and a discriminator D,
acquiring the view angle conversion network model comprises:
acquiring a preset input image x and a preset input encoding vector c of the training object;
acquiring a pre-generated image G(x, c) output by the generator G according to the preset input image x and the preset input encoding vector c;
determining an adversarial loss Ladv according to the pre-generated image G(x, c) and a probability distribution D(x) of the discriminator D, wherein the adversarial loss Ladv is defined as:

$$L_{adv}=E_x[\log D(x)]+E_{x,c}[\log(1-D(G(x,c)))]; \text{ and}$$

calculating a target value of the adversarial loss Ladv such that the probability distribution D(x) of the discriminator D takes a maximum value while the pre-generated image G(x, c) takes a minimum value.

9. The method of claim 8, wherein the target object is a wafer,
determining according to the stereoscopic image whether the target object has a fault comprises:
determining according to the stereoscopic image whether the wafer has a defect.

10. An image view angle conversion device, comprising:
a memory storing processor-executable instructions; and
a processor configured to execute the stored processor-executable instructions to perform operations of:
acquiring model training data, the model training data comprising planar images of a training object at a plurality of different view angles and labels corresponding to respective view angles, wherein the labels corresponding to the different view angles are different;
training a pre-designed generative adversarial network model according to the model training data to obtain a view angle conversion network model; and
inputting a planar image of a target object and labels corresponding to one or more expected view angles of the target object into the view angle conversion network model, so that the view angle conversion network model generates planar images of the target object at the expected view angles;
wherein the labels comprise encoding vectors, and the generative adversarial network model comprises a generator G and a discriminator D,
acquiring the view angle conversion network model comprises:
acquiring a preset input image x and a preset input encoding vector c of the training object;
acquiring a pre-generated image G(x, c) output by the generator G according to the preset input image x and the preset input encoding vector c;
determining an adversarial loss Ladv according to the pre-generated image G(x, c) and a probability distribution D(x) of the discriminator D, wherein the adversarial loss Ladv is defined as:

$$L_{adv}=E_x[\log D(x)]+E_{x,c}[\log(1-D(G(x,c)))]; \text{ and}$$

calculating a target value of the adversarial loss Ladv such that the probability distribution D(x) of the discriminator D takes a maximum value while the pre-generated image G(x, c) takes a minimum value.

11. The device of claim 10, wherein acquiring the model training data comprises:
acquiring a three-dimensional model of the training object, and project the three-dimensional model to obtain the planar images of the training object at the plurality of different view angles; and
generating encoding vectors of which the number is the same as the number of the planar images, and label the planar images at the plurality of different view angles with respective labels.

12. The device of claim 11, wherein the target object is a wafer.

13. The device of claim 11, wherein the planar images at the plurality of different view angles comprise at least two of a front view planar image, a left oblique side view planar image, a right oblique side view planar image, a side view planar image and a top view planar image.

14. A fault determination device, comprising:
a memory storing processor-executable instructions; and
a processor configured to execute the stored processor-executable instructions to perform operations of claim 9.

15. The device of claim 14, wherein the target object is a wafer; and
the fault determination module includes a defect determination module configured to determine according to the stereoscopic image whether the wafer has a defect.

16. A non-transitory computer-readable storage medium having stored thereon computer-readable instructions that, when executed by a processor, cause the processor to perform the method of claim 1.

* * * * *